US009822482B2

(12) United States Patent
Chen et al.

(10) Patent No.: US 9,822,482 B2
(45) Date of Patent: *Nov. 21, 2017

(54) METHOD FOR PREPARING A FUNCTIONAL FILM VIA COFFEE OIL AND TEXTILE THEREOF

(71) Applicant: SINGTEX INDUSTRIAL CO., LTD, New Taipei (TW)

(72) Inventors: Kuo-Chin Chen, New Taipei (TW); Li-Hsun Chang, New Taipei (TW); Lai-Hung Wan, New Taipei (TW)

(73) Assignee: Singtex Industrial Co., Ltd., New Taipei (TW)

( * ) Notice: Subject to any disclaimer, the term of this patent is extended or adjusted under 35 U.S.C. 154(b) by 762 days.

This patent is subject to a terminal disclaimer.

(21) Appl. No.: 13/678,019

(22) Filed: Nov. 15, 2012

(65) Prior Publication Data
US 2013/0137323 A1 May 30, 2013

Related U.S. Application Data

(60) Provisional application No. 61/560,464, filed on Nov. 16, 2011.

(51) Int. Cl.
*C08G 18/36* (2006.01)
*C08J 5/18* (2006.01)
(Continued)

(52) U.S. Cl.
CPC ......... *D06N 3/146* (2013.01); *C08G 18/0823* (2013.01); *C08G 18/36* (2013.01);
(Continued)

(58) Field of Classification Search
CPC .. B05D 5/083; C08G 18/36; C08J 5/18; C08J 3/22; C08J 2375/04; C09D 175/04; C06N 3/146
(Continued)

(56) References Cited

U.S. PATENT DOCUMENTS 6,433,121 B1 * 8/2002 Petrovic .............. C07D 303/42
527/600
7,674,925 B2 3/2010 Garrett et al.
(Continued)

FOREIGN PATENT DOCUMENTS

TW I338729 3/2011

OTHER PUBLICATIONS

Johnson et al., A look at Using anitfoams in the Brewery, Jul./Aug. 2009, The New Brewer.*

*Primary Examiner* — Dah-Wei D Yuan
*Assistant Examiner* — Hai Yan Zhang
(74) *Attorney, Agent, or Firm* — Muncy, Geissler, Olds & Lowe, P.C.

(57) ABSTRACT

The present invention relates to a method for preparing a functional film via coffee oil, comprising (a) extracting a coffee oil from coffee; (b) modifying the coffee oil to obtain an epoxidized coffee oil; (c) adding an alcohol into the epoxidized coffee oil to obtain a coffee polyol; (d) synthesizing a polyurethane dispersive solution with the coffee polyol; (e) coating a surface of a substrate with the polyurethane dispersive solution; and (f) drying and fixing the surface of the substrate. The present invention further provides a functional textile comprising a functional film prepared by the method of above.

9 Claims, 9 Drawing Sheets

(51) Int. Cl.

| | |
|---|---|
| *C09D 175/04* | (2006.01) |
| *C08J 3/22* | (2006.01) |
| *D06N 3/14* | (2006.01) |
| *C08G 18/48* | (2006.01) |
| *C08G 18/66* | (2006.01) |
| *C08G 18/75* | (2006.01) |
| *C08G 18/08* | (2006.01) |
| *D21H 17/57* | (2006.01) |
| *D21H 19/62* | (2006.01) |

(52) U.S. Cl.
CPC ..... *C08G 18/4808* (2013.01); *C08G 18/4854* (2013.01); *C08G 18/6696* (2013.01); *C08G 18/755* (2013.01); *C09D 175/04* (2013.01); *D06N 3/14* (2013.01); *D21H 17/57* (2013.01); *D21H 19/62* (2013.01); *C08G 2150/60* (2013.01); *D06N 2205/04* (2013.01); *D06N 2209/123* (2013.01); *D06N 2209/128* (2013.01); *Y10T 442/20* (2015.04)

(58) Field of Classification Search
USPC ........................................ 427/389.9; 428/357
See application file for complete search history.

(56) References Cited

U.S. PATENT DOCUMENTS

| | | | | |
|---|---|---|---|---|
| 7,696,370 | B2 | 4/2010 | Suppes et al. | |
| 7,786,239 | B2 | 8/2010 | Petrovic et al. | |
| 2002/0018839 | A1* | 2/2002 | Chmiel | A23C 11/04 426/594 |
| 2007/0003492 | A1* | 1/2007 | Kitahata | A23G 4/06 424/49 |
| 2007/0238800 | A1* | 10/2007 | Neal | C08G 18/283 521/174 |
| 2008/0236449 | A1 | 10/2008 | Yang et al. | |
| 2010/0063180 | A1* | 3/2010 | Kang | A62D 1/005 523/337 |
| 2010/0330375 | A1 | 12/2010 | Pajerski et al. | |

* cited by examiner

METHOD FOR PREPARING A FUNCTIONAL FILM VIA COFFEE OIL AND TEXTILE THEREOF

CROSS REFERENCE TO RELATED APPLICATIONS

This application claims priority to the following: U.S. Provisional Patent Application No.: 61/560,464 filed on Nov. 16, 2011, U.S. The disclosure of said application is hereby expressly incorporated by reference in its entirety.

FIELD OF THE INVENTION

The present invention relates to a method for preparing a functional film via coffee oil and textile thereof.

BACKGROUND OF THE INVENTION

Coffee grounds have been considered as garbage produced when manufacturing coffee beverage for a long time, and are discarded by soil burial without proper use. Currently, TW Patent No: I338729 discloses a textile application of coffee grounds. Coffee grounds contain oils. To improve textile process yield, it is needed to remove organic components in coffee grounds. However, secondary waste (ex: coffee oil) is produced during the removing process and can not be effectively used. This waste influences the environment and takes much cost after treating process. Therefore, recovery and utilization of waste coffee oil are relative important under a rise in environmental issues.

Biomass is generally obtained from natural products, including directly use of natural plants (such as corn, palm, soy, etc.), or reuse of waste natural plants (such as coffee grounds, rice straw, waste wood, etc.). Utilizing waste of natural plant will not cause food conflict. This patent technique described above has disclosed the usage of coffee grounds for textile application. If coffee oil contained in coffee grounds can be recycled and reused to reduce generation of second waste, it will be helpful to reduce environmental impact and regarded as a kind of biomass.

In general, functional fabrics reaching waterproof and moisture permeability are made by coating of colloidal polymeric material or laminating of hydrophilicity film. Currently, the film with function of waterproof and moisture permeability is made by chemicals such as polyurethane which is artificially synthesized by petrochemicals. Polyurethane is a liner blocked copolymer formed by reacting polyester or polyether polyol with diisocyanate and small molecule of chain extender. It contains two kinds of segment: one is a soft segment which is consisted of polyester, polyether or polyamine diol and diisocyanate. The other one is a hard segment which is consisted of diisocyanate (aromatic compounds or aliphatic compounds) and chain extender.

In view of that raw materials for making polyurethane are obtained by petroleum oil, developing natural polyol to replace the petroleum product becomes desirable for both sustainable and environmental reasons. In PU manufacturing, vegetable oil from corn and soybean can be replacement for polyols. Patent as U.S. Pat. Nos. 7,786,239, 7,674,925, 7,696,370 or 6,433,121 uses soy oil to produce natural polyol. Due to the content of unsaturated fatty acid in soy oil is up to 84%, higher than the content of coffee oil (54.6%), hydroxy value (OH value) of the polyol produced from coffee oil is lower than that of the polyol produced from soy oil. The lower OH value will affect reactivity of subsequent PU synthesis and result in incomplete import of coffee polyol to PU main chain.

Therefore, how to use natural waste to reach the goal of re-use of resources is most needed to be studied.

SUMMARY OF THE INVENTION

Figure 1:
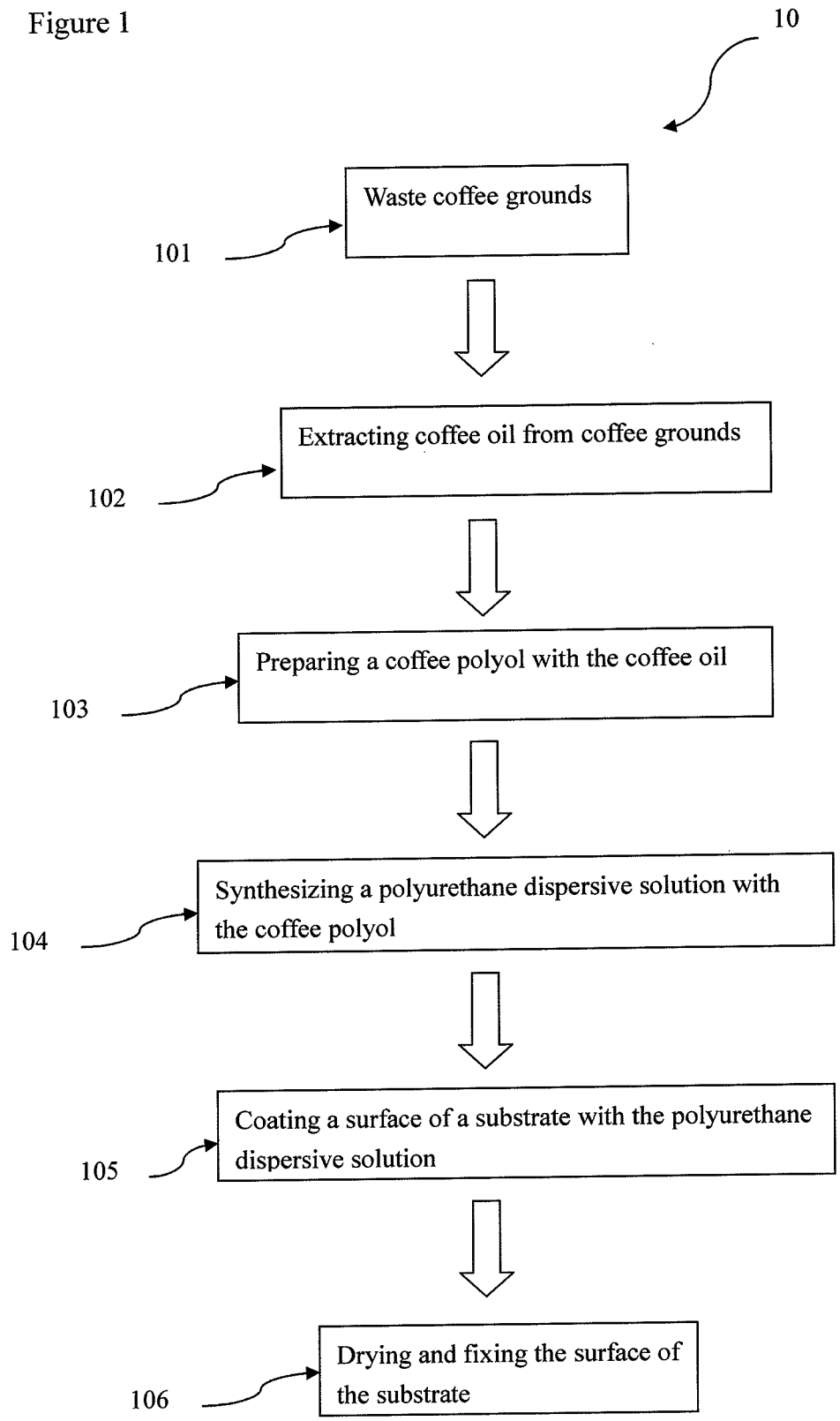
FIG. 1 is a process flow diagram of the present invention for preparing a functional film via coffee oil.

The present invention relates to a method for preparing a functional film via coffee oil, comprising (a) extracting a coffee oil from coffee; (b) modifying the coffee oil to obtain an epoxidized coffee oil; (c) adding an alcohol into the epoxidized coffee oil to obtain a coffee polyol; (d) synthesizing a polyurethane dispersive solution with the coffee polyol; (e) coating a surface of a substrate with the polyurethane dispersive solution; and (f) drying and fixing the surface of the substrate. The present invention further provides a functional textile comprising a functional film prepared by the method of above.

DETAILED DESCRIPTION OF THE INVENTION

In view of the environmental pollution caused by manufacturing textile with chemicals, and a concern of growing waste recycling issues, the present invention studies the recycling of wasted coffee oil. Coffee oil is extracted and purified from coffee grounds and needs to be modified to obtain coffee polyol. Then, the coffee polyol reacts with isocynate to produce polyurethane. Finally the invention applies the polyurethane in making functional textiles with function of waterproof and moisture permeability. In the present invention, polyurethane is synthesized by substituting a portion of petroleum polyol with bio-based coffee polyol, replacing 27% of petrochemical molecules to avoid an incomplete import of coffee polyol to PU main chain.

The present invention prepares coffee polyol by using coffee oil and synthesizes polyurethane through the reaction with isocyanate. This polyurethane is further applied in a fabric made by coffee yarn (TW Patent No: I338729) to form a coffee textile. All raw materials of the textile are made by waste coffee grounds. The coffee textile of the present invention is tested, following the functional requirements of general textiles: air permeability, moisture permeability and waterproof ability. The results also examine the pH variation, show that the textiles of the present invention do not cause human skin discomfort.

A renewable coffee oil from wasted coffee ground consists mainly of triglycerides includes unsaturated fatty acids of palmitic acid and linoleic acid. The double bonds of thus unsaturated fatty acids of the oil perform chemical reaction via epoxidization and hydrolysation to introduce the hydroxyl groups on the alkane main chain. The alkanes with hydroxyl groups can be used to replace soft segment of polyurethane. The polyurethane of the present invention not only retains the characteristics of general polyurethane but also complies with norms of global environmental products.

Therefore, the present invention provides a method for preparing a functional film via coffee oil, comprising:
(a) extracting a coffee oil from coffee;
(b) modifying the coffee oil to obtain an epoxidized coffee oil;
(c) adding an alcohol into the epoxidized coffee oil to obtain a coffee polyol;
(d) synthesizing a polyurethane dispersive solution with the coffee polyol;
(e) coating a surface of a substrate with the polyurethane dispersive solution; and
(f) drying and fixing the surface of the substrate.

The functional film or textile described in the present invention means a film or textile with waterproof function, moisture permeability or air permeability.

According to embodiments of method of preparing a functional film via coffee oil in the present invention, the coffee comprises ground coffee beans which have been baked or not baked or coffee grounds. The method of extracting a coffee oil from coffee is distillation method, supercritical carbon dioxide method, resin extraction, expeller process or solvent extraction.

According to embodiments of method of preparing a functional film via coffee oil in the present invention, the method of modifying the coffee oil to obtain an epoxidized coffee oil is adding the coffee oil into a solution of acidic solution, water and/or hydrogen peroxide. The acidic solution is a glacial acetic acid solution containing peroxy acid, peracetic acid solution, sulfuric acid solution, oxalate solution and other organic acids containing carboxyl group or mixtures thereof.

According to embodiments of method of preparing a functional film via coffee oil in the present invention, the alcohol is methanol, ethanol, diol, alkanes containing hydroxyl group or mixtures thereof.

According to embodiments of method of preparing a functional film via coffee oil in the present invention, the coffee polyol is a polyol with fatty acid containing a hydroxyl group, and the fatty acid thereof is palmitic acid, stearic acid, oleic acid, linoleic acid, linolenic acid or arachidic acid.

According to embodiments of method of preparing a functional film via coffee oil in the present invention, the above step (d) further comprises:
(i) polymerizing a mixture generated by mixing and dissolving the coffee polyol with isocyanate or isocyanate mixture to produce a prepolymer;
(ii) adding an emulsifier to the prepolymer for emulsification;
(iii) adding a neutralizer for neutralizing the reaction; and
(iv) adding a chain extender to obtain the polyurethane dispersive solution.

According to embodiments of method of preparing a functional film via coffee oil in the present invention, the mixture comprises dimethylol propionic acid (DMPA), dimethylacetamide (DMAC) and/or acetone.

According to embodiments of method of preparing a functional film via coffee oil in the present invention, the emulsifier is a coffee polyol. The neutralizer is sodium hydroxide aqueous solution, potassium hydroxide aqueous solution or triethylamine (TEA) aqueous solution.

According to embodiments of method of preparing a functional film via coffee oil in the present invention, the chain extender comprises 1,4 butanediol solution, ethylenediamine (EDA) solution, benzenediamine solution or amino ethyl ethanol amine (AEEA).

According to embodiments of method of preparing a functional film via coffee oil in the present invention, the polyurethane is water-based or solvent-based.

According to embodiments of method of preparing a functional film via coffee oil in the present invention, the substrate comprises a fibrous layer, release paper or a polyester film. The fibrous layer comprises a woven fabric, knitted fabric or non-woven fabric.

As described in the present invention, the surface of the substrate is coated with the polyurethane dispersive solution, and the polyurethane dispersive solution in which a cross-linker (such as melamine solution, poly(melamine-co-formaldehyde) solution, poly(melamine-co-formadehyde) isobutylated solution or water dispersible polyisocynate) is added is fixed on the fabric through drying.

The present invention also provides a functional textile comprising a functional film prepared by the above method.

The drawings and specific embodiments below are combined as further elaboration of the present invention.

EXAMPLES

The preferred embodiments of the present invention will be described in detail below. The reference number in the examples is the same as the number shown in FIG. 1. Please refer to the figure and the detailed description at the same time. The examples below are non-limiting and are merely representative of various aspects and features of the present invention.

Example 1

Method for Extracting a Coffee Oil 28 kg coffee grounds (101) were stirred at 80° C. for 2 hours to remove water and 14 kg dry coffee grounds were obtained. Then, coffee oil was extracted by supercritical carbon dioxide. 14 kg coffee grounds after removal of water were divided into two groups of 7 kg, each group was filled evenly into a 20 L extraction tank along with 2 kg glass beads (particle size of 5 mm), respectively. The oil was extracted by high pressure pump with carbon dioxide of 463 g/min flow rate. The pressure in the extraction tank was controlled at 5075 psig. The temperature in the extraction tank was 65° C. The pressure in the separation chamber was 900 psig. The temperature in the separation chamber was 70° C. After 400 minutes extraction, 1.68 kg coffee oil was collected (102).

Example 2

Preparing Coffee Polyol Via the Coffee Oil (103)

20 kg coffee oil extracted through the method above was added into 1.4 kg glacial acetic acid and 2 kg pure water in a 100 kg reaction tank with catalysts of 120 g sulfuric acid and 500 g acetic acid, and then mixed evenly. After heated to 70° C., 12 kg hydrogen peroxide (35%) was slowly added within 3 hours. After reaction of 3.5 hours, the mixture was washed six times with 20 kg pure water. The water layer in the bottom was separated before 11 kg methanol (95%) was added. After reflux for 8 hours at 68° C., the methanol was removed by a vacuum system device to obtain about 20 kg coffee polyol.

Example 3

Synthesizing a Water-Based Polyurethane (PU) Dispersive Solution (104) with the Coffee Polyol (104)

34 g coffee polyol after removal of water, 145 g Poly (tetramethylene ether)glycol (PTMG), 45 g poly propylene glycol (PPG) and 18 g dimethylol propionic acid (DMPA) were added in a four-necked flat-bottomed flask and mixed evenly with a rotational speed of 500 rpm at 70° C. under a nitrogen atmosphere. 90 g IPDI was slowly added after dissolution to begin the reaction at 85° C. The reaction was monitored by the NCO content of isocynate terminated prepolymer using a titration method of ASTM-D1368. When the NCO content of the prepolymer is less than 90% of the theoretical value, the temperature was cooled down to 60° C. 13.5 g triethylamine (TEA) was added to neutralize the reaction for 10 minutes. After completion of the neutralization reaction, the temperature was dropped to room temperature. 77 g coffee polyol was added for emulsification to obtain a 27% coffee oil of prepolymer. 485 g deionized water was then added for proceeding phase transition. After completion of the phase transition, 11.10 g amino ethyl ethanol amine (AEEA) in pure water (10 g) was slowly added. A milky white emulsion was obtained after completion of the reaction.

Example 4

Synthesizing a Solvent-Based Polyurethane (PU) Dispersive Solution (104) with the Coffee Polyol (104)

34 g coffee polyol after removal of water, 195 g Poly (tetramethylene ether)glycol (PTMG) and 1000 g mixed solvents consisting of dimethyl fumarate (DMF), toluene and methyl ethyl ketone (MEK) were added in a 2 L four-necked round bottom flask and mixed evenly with a rotational speed of 500 rpm at 70° C. under a nitrogen atmosphere. 90 g IPDI was slowly added after dissolution. The reaction was monitored by the NCO content of isocynate terminated prepolymer using a titration method of ASTM-D1368. When the NCO functional group content of the prepolymer is less than 90% of the theoretical value, the prepolymerization was terminated. 77 g coffee polyol was slowly added for emulsification, and then 10.17 g AEEA in DMAC (20 g) was added to complete the reaction.

Example 5

Figure 8:
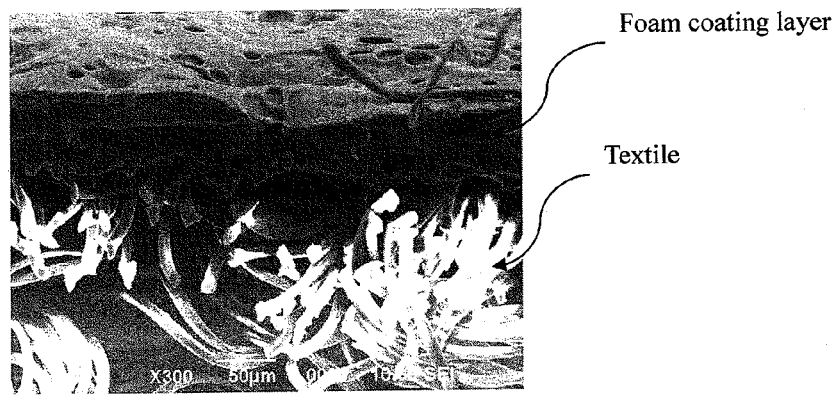
FIG. 8 is a SEM sectional diagram (magnification: 300×) showing foam coating textiles of the invention prepared by using coffee oil.

Foam Coating a Surface of a Substrate with the Polyurethane (PU) Dispersive Solution The polyurethane dispersive solution was synthesized with coffee oil through the above method (Examples 1-3). To a 100 g water-based PU dispersive solution was added 0.5 g frothing agent and 3 g crosslinker and rapidly stirred 5 to 10 minutes. Then 3 g foam stabilizer was added and rapidly stirred 2 to 3 minutes. After foaming (blow ratio is 3:1), a fabric made by coffee yarn (TW Patent Publication No: 200918695) was evenly coated with the form (105). The coated fabric was predried at 90° C. for 1.5 minutes and then fixed by baking at 150° C. for 1 minute (106) to obtain a functional textile. A SEM cross sectional diagram (magnification: 300×) of foam coating textiles prepared by using coffee oil was shown as FIG. 8.

Example 6

Figure 9:
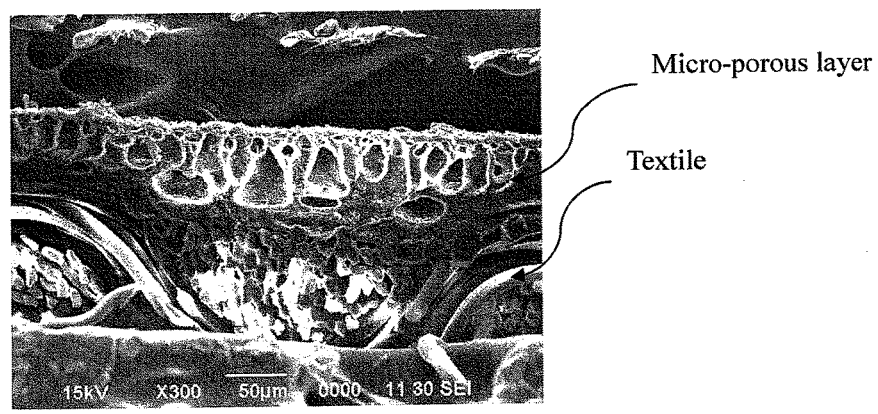
FIG. 9 is a SEM sectional diagram (magnification: 300×) showing microporous textiles of the invention prepared by using coffee oil.

Preparing a Microporous Layer on a Surface of a Substrate Through Using Polyurethane (PU) Dispersive Solution The polyurethane dispersive solution was synthesized with coffee oil through the above method (Examples 1, 2 and 4). To a 100 g solvent-based PU dispersive solution was added 3 g crosslinker and rapidly stirred 5 to 10 minutes. Then 3 g thickening agent was added and rapidly stirred 2 to 3 minutes. The mixture was evenly spread on a fabric made by coffee yarn (105). After phase transfer in water bath at 80° C., the coated fabric was predried at 90° C. for 1.5 minutes and then fixed by baking at 150° C. for 1 minute (106). Then the fabric was coated with coffee print (i.e. PU dispersive solution formed by coffee granules made as TW Patent Publication No: 200918695) to obtain a functional textile. A SEM cross sectional diagram (magnification: 300×) of microporous textiles prepared by using coffee oil was shown as FIG. 9.

Example 7

Functional Tests For Coffee Textiles pH Test

Figure 2:
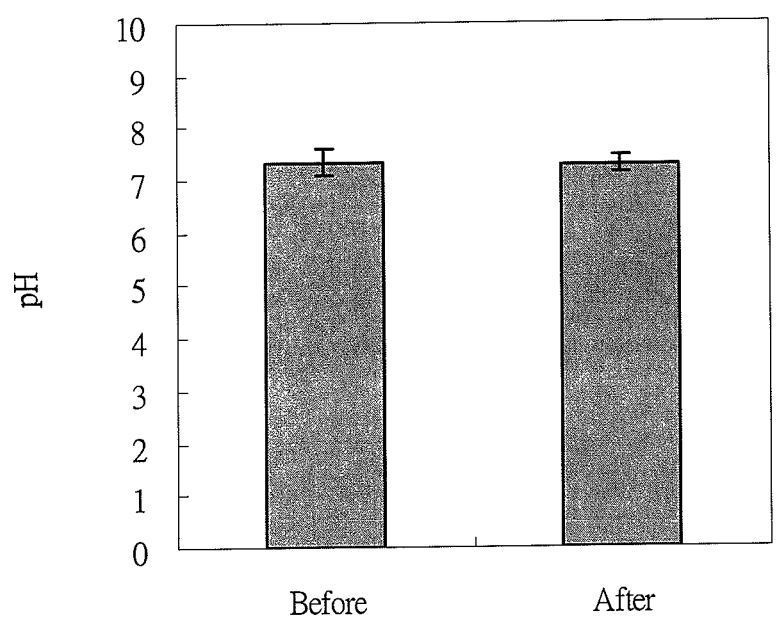
FIG. 2 shows pH test result of foam coating textiles of the invention prepared by using coffee oil.

The test was proceeding according to AATCC 81 standard. Samples were divided into two parts. One is a sample washed 20 times by washing machine; and one is a sample not washed. 10 g foam coating textiles of the present invention prepared by using coffee oil (Example 5) was cut into fragments with 1 cm×1 cm area. The fragments were placed in 250 g distilled water in a beaker and boiled at 100° C. for 10 minutes. pH value was measured after cooling. The pH value of coffee textiles of the present invention was between 6-8, as shown in FIG. 2. The results showed that the coffee textiles of the present invention will not cause human skin discomfort.

Air Permeability Test

Figure 3:
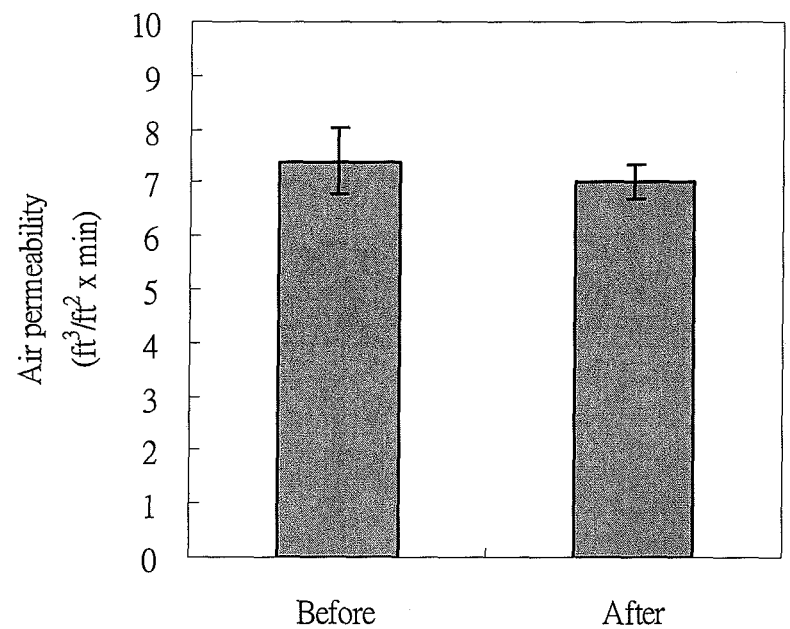
FIG. 3 shows air permeability test result of foam coating textiles of the invention prepared by using coffee oil.

The test was proceeding according to ASTM D737 standard. Samples were divided into two parts. One is a sample washed 20 times by washing machine; and another one is a sample not washed. The result of air permeability test of foam coating textiles of the present invention prepared by using coffee oil (Example 5) was shown in FIG. 3. The air permeability of coffee textile of the present invention was 7.4 ft$^3$/ft$^2$/min. The textile of the present invention still retained air permeability after being washed 20 times.

Rain Test

Figure 4:
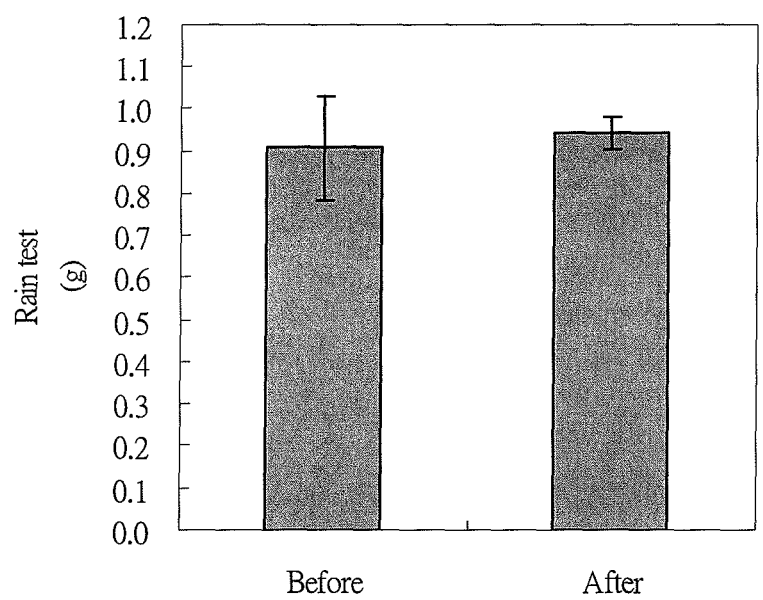
FIG. 4 shows rain test result of foam coating textiles of the invention prepared by using coffee oil.

The test was proceeding according to AATCC 35 standard. Samples were divided into two parts. One is a sample washed 20 times by washing machine; and another one is a sample not washed. The result of rain test of foam coating textiles of the present invention prepared by using coffee oil (Example 5) was shown in FIG. 4. The test value of coffee textile of the present invention was 0.9 g. The rain test value of the textile of the present invention was not reduced after the textile was washed 20 times.

Moisture Permeability Test

Figure 5:
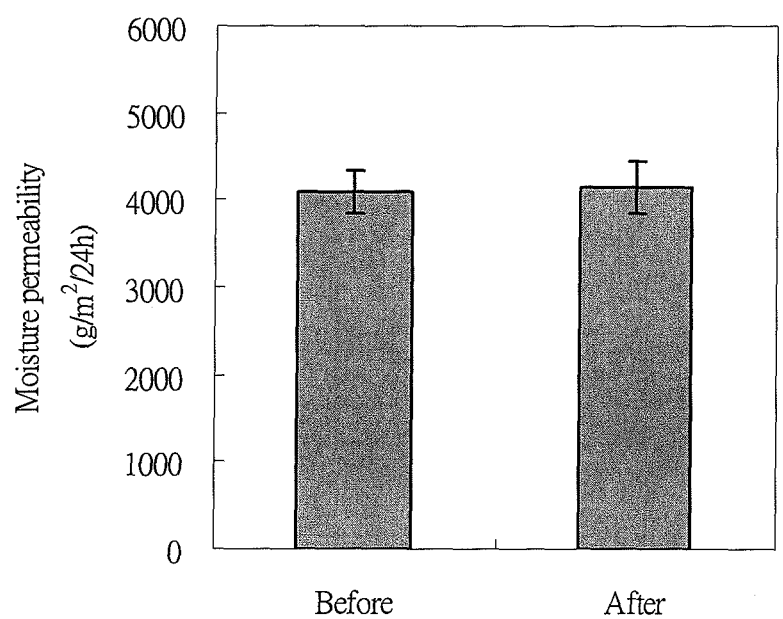
FIG. 5 shows moisture permeability test result of foam coating textiles of the invention prepared by using coffee oil.

The test was proceeding according to JIS-L 1099 B1 standard. Samples were divided into two parts. One is a sample washed 20 times by washing machine; and another one is a sample not washed. The result of moisture permeability test of foam coating textiles of the present invention prepared by using coffee oil (Example 5) was shown in FIG. 5. The test value was 4094 g/m$^2$/24 h. The moisture permeability of the textile of the present invention was not reduced after the textile was washed 20 times.

Figure 6:
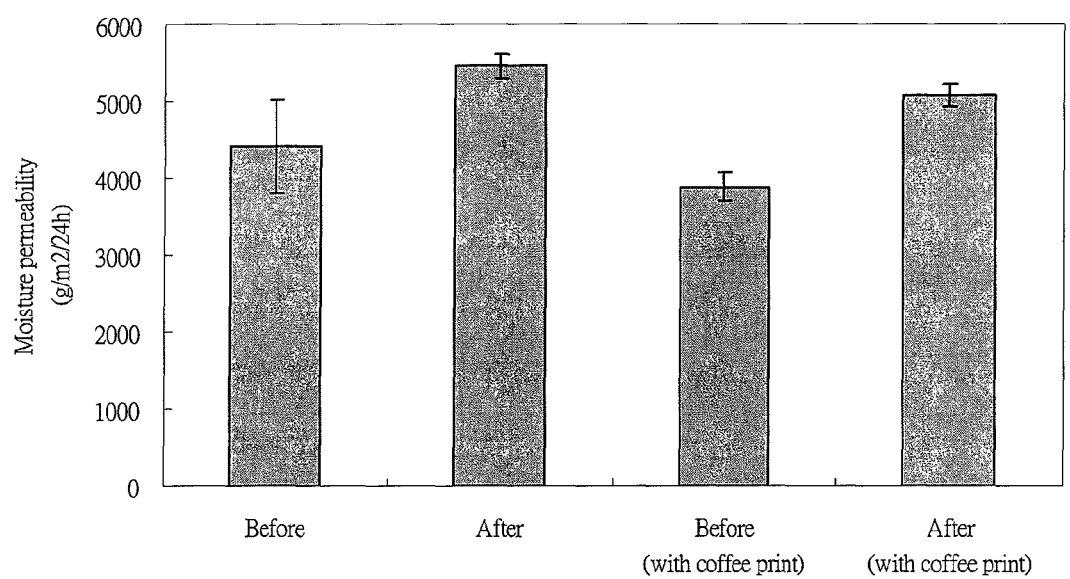
FIG. 6 shows moisture permeability test result of microporous textiles of the invention prepared by using coffee oil.

The test was proceeding according to JIS-L 1099 A1 standard. Samples were divided into two parts. One is a sample washed 20 times by washing machine; and another one is a sample not washed. The result of moisture permeability test of microporous textiles of the present invention prepared by using coffee oil (Example 6) was shown in FIG. 6. The test value of the textile not coated with coffee print was 4410 g/m$^2$/24 h, and the test value of the textile coated with coffee print was 3887 g/m$^2$/24 h. The moisture permeability of the textile of the present invention was not reduced after the textile was washed 20 times.

Waterproof Test

Figure 7:
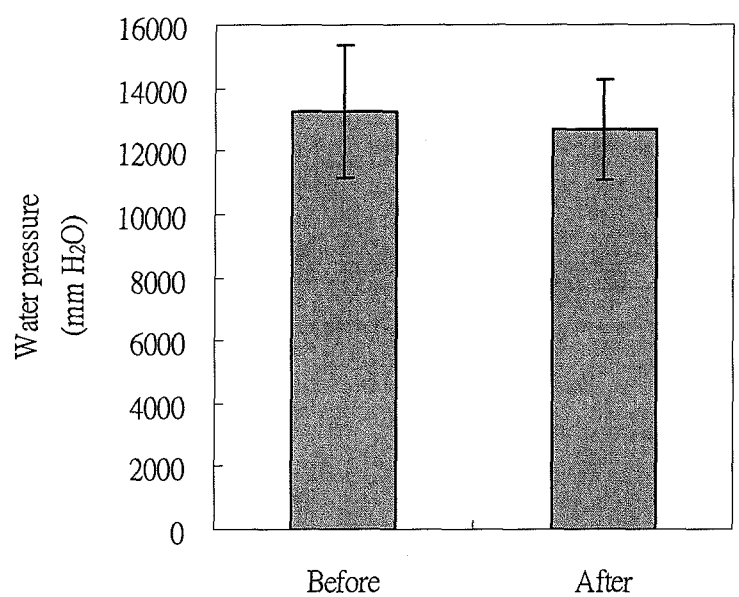
FIG. 7 shows waterproof test result of microporous textiles of the invention prepared by using coffee oil.

The test was proceeding according to JIS-L 1092 B standard. Samples were divided into two parts. One is a sample washed 20 times by washing machine; and another one is a sample not washed. The result of waterproof test of microporous textiles of the present invention prepared by using coffee oil (Example 6) was shown in FIG. 7. The test value was 13257 mmH$_2$O. The waterproof value of the textile of the present invention was not reduced after the textile was washed 20 times.

One skilled in the art readily appreciates that the present invention is well adapted to carry out the objects and obtain the ends and advantages mentioned, as well as those inherent therein. The films and processes and methods for producing them are representative of preferred embodiments, are exemplary, and are not intended as limitations on the scope of the invention. Modifications therein and other uses will occur to those skilled in the art. These modifications are encompassed within the spirit of the invention and are defined by the scope of the claims.

It will be readily apparent to a person skilled in the art that varying substitutions and modifications may be made to the invention disclosed herein without departing from the scope and spirit of the invention.

All patents and publications mentioned in the specification are indicative of the levels of those of ordinary skill in the art to which the invention pertains. All patents and publications are herein incorporated by reference to the same extent as if each individual publication was specifically and individually indicated to be incorporated by reference.

The invention illustratively described herein suitably may be practiced in the absence of any element or elements, limitation or limitations, which are not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method for preparing a functional film via coffee oil, comprising:
    (a) extracting a coffee oil from coffee;
    (b) modifying the coffee oil to obtain an epoxidized coffee oil;
    (c) adding an alcohol into the epoxidized coffee oil to obtain a coffee polyol;
    (d) synthesizing a polyurethane dispersive solution with the coffee polyol;
    (e) coating a surface of a substrate with the polyurethane dispersive solution, the substrate being one of fibrous layer, release paper and polyester film; and
    (f) drying and fixing the surface of the substrate, wherein the step (d) includes:
    (i) polymerizing a mixture generated by mixing and dissolving the coffee polyol with isocyanate or isocyanate mixture to produce a prepolymer;
    (ii) adding the coffee polyol to the prepolymer for emulsification;
    (iii) adding a neutralizer for neutralizing the reaction; and
    (iv) adding a chain extender to obtain the polyurethane dispersive solution.

2. The method of claim 1, wherein the coffee of step (a) comprises ground coffee beans which have been baked or not baked or coffee grounds.

3. The method of claim 1, wherein the method of extracting a coffee oil from coffee is distillation method, supercritical carbon dioxide method, resin extraction, expeller pressed process or solvent extraction.

4. The method of claim 1, wherein the method of modifying the coffee oil to obtain an epoxidized coffee oil of step (b) is adding the coffee oil into a solution of peroxy acid-containing glacial acetic acid solution, peracetic acid solution, sulfuric acid solution, oxalate solution, water, hydrogen peroxide, or mixtures thereof.

5. The method of claim 1, wherein the alcohol of step (c) is methanol, ethanol, diol, alkanes containing hydroxyl group or mixtures thereof.

6. The method of claim 1, wherein the coffee polyol of step (d) is a polyol with fatty acid containing a hydroxyl group.

7. The method of claim 6, wherein the fatty acid is palmitic acid, stearic acid, oleic acid, linoleic acid, linolenic acid or arachidic acid.

8. The method of claim 1, wherein the substrate of step (e) comprises a fibrous layer, release paper or a polyester film.

9. The method of claim 8, wherein the fibrous layer comprises a woven fabric, knitted fabric or non-woven fabric.

* * * * *